United States Patent [19]

Sato

[11] 4,277,811

[45] Jul. 7, 1981

[54] STATIC TYPE CIRCUIT BREAKER

[75] Inventor: Kozo Sato, Hino, Japan

[73] Assignee: Tokyo Shibaura Electric Company, Limited, Kawasaki, Japan

[21] Appl. No.: 21,706

[22] Filed: Mar. 19, 1979

Related U.S. Application Data

[63] Continuation-in-part of Ser. No. 771,329, Feb. 23, 1977, abandoned.

[30] Foreign Application Priority Data

Feb. 23, 1976 [JP] Japan .................................. 51-18021
Feb. 23, 1976 [JP] Japan .................................. 51-18029

[51] Int. Cl.³ ........................................... H02H 3/08
[52] U.S. Cl. .................................... 361/101; 361/94; 361/98
[58] Field of Search .................................. 361/93–98, 361/100, 101, 106, 18; 323/9, 22 T; 363/55, 56

[56] References Cited

U.S. PATENT DOCUMENTS 3,211,927 10/1965 Klee ........................................ 361/98
3,214,641 10/1965 Sonnemann .......................... 361/98
3,875,464 4/1975 Gary et al. ........................ 361/97 X Primary Examiner—Patrick R. Salce
Attorney, Agent, or Firm—Oblon, Fisher, Spivak, McClelland & Maier

[57] ABSTRACT

A static type circuit breaker in which a transistor is arranged in the current path by which electrical power is supplied to a load from a power source. If short circuit trouble occurs, the fault current flowing in the load circuit is detected so that a luminous diode in a detector circuit is made to cease emitting light. A phototransistor photocoupled to this luminous diode and arranged in the base circuit of the transistor is made non-conductive and produces a short circuit between the base and the emitter of the transistor, whereby the transistor is made non-conductive so that the fault current is cut off.

10 Claims, 7 Drawing Figures

STATIC TYPE CIRCUIT BREAKER

CROSS REFERENCE TO RELATED APPLICATIONS

This application is a Continuation-In-Part of U.S. Pat.Application Ser. No. 771,329 filed Feb. 23, 1977, now abandoned.

BACKGROUND OF THE INVENTION

1. Field of the Invention

This invention relates to a static type circuit breaker which cuts off a fault current flowing in a current path, and in particular it relates to a static type circuit breaker in which a transistor is used as a switch element.

2. Description of the Prior Art

When short circuit trouble or the like occurs in a load circuit in the current path by which electrical power is supplied to the load, a fault current which is several times to several dozen times greater than the rated current flows in the load circuit, and there is a danger that this may cause electrical and thermal damage.

Circuit breakers which detect and cut off this fault current and provide protection for the current path have hitherto been provided with mechanical circuit breaker units in most cases.

Circuit breakers having mechanical circuit breaker units are provided with at least one pair of contact members, adapted to be separated from one another, for each phase, and to cut off the fault current by the mechanical opening and closing of these contact members. For this reason their life is short, and faults are frequent, because of the wear and deterioration of the mechanically movable parts.

Also, when the circuit is broken an arc occurs between the contact members and therefore the breaking time is long and the breaking capacity is small, and for extinguishing this arc, arc extinguishing apparatus has to be added to this circuit breaker unit, and the unit becomes bulky.

On the other hand, static type circuit breakers in which thyristors are used as circuit breaker units have been introduced, but the greatest defect of these is that, in order to cut off the fault current at high speed, commutation circuits are needed for producing a current directed oppositely to the forward direction flow to the thyristors and making their current less than the holding current. The commutation circuits call for not less than 30% of the cost and space of the whole apparatus, and they are therefore disadvantagious as regards both economy and dimensions. Also, in cases in which repeated circuit breaking is carried out, time is required for charging the condensers of the commutation circuits, and therefore there is the disadvantage that high speed repeated circuit breaking cannot be carried out.

SUMMARY OF THE INVENTION

Accordingly, one object of this invention is to provide a compact quiet static type circuit breaker in which mechanically movable parts are eliminated and the breaking time is short and which has a long life.

Another object of this invention is to provide a static type circuit breaker not requiring a commutation circuit for circuit breaking, which is compact and inexpensive and which permits high speed repeated circuit breaking.

According to this invention, there is provided a static type circuit breaker comprising a transistor connected in series in a load circuit connecting a power source and a load, a detector circuit which detects a fault current flowing in the load circuit, and a base circuit which by means of a detection signal of the detection circuit shuts off the base current of the transistor and makes the transistor non-conductive.

BRIEF DESCRIPTION OF THE DRAWINGS

By reading the particular description with reference to the following drawings, it will be possible to obtain a better understanding of the objects and technological effects of this invention.

DESCRIPTION OF THE PREFERRED EMBODIMENTS

Figure 1:
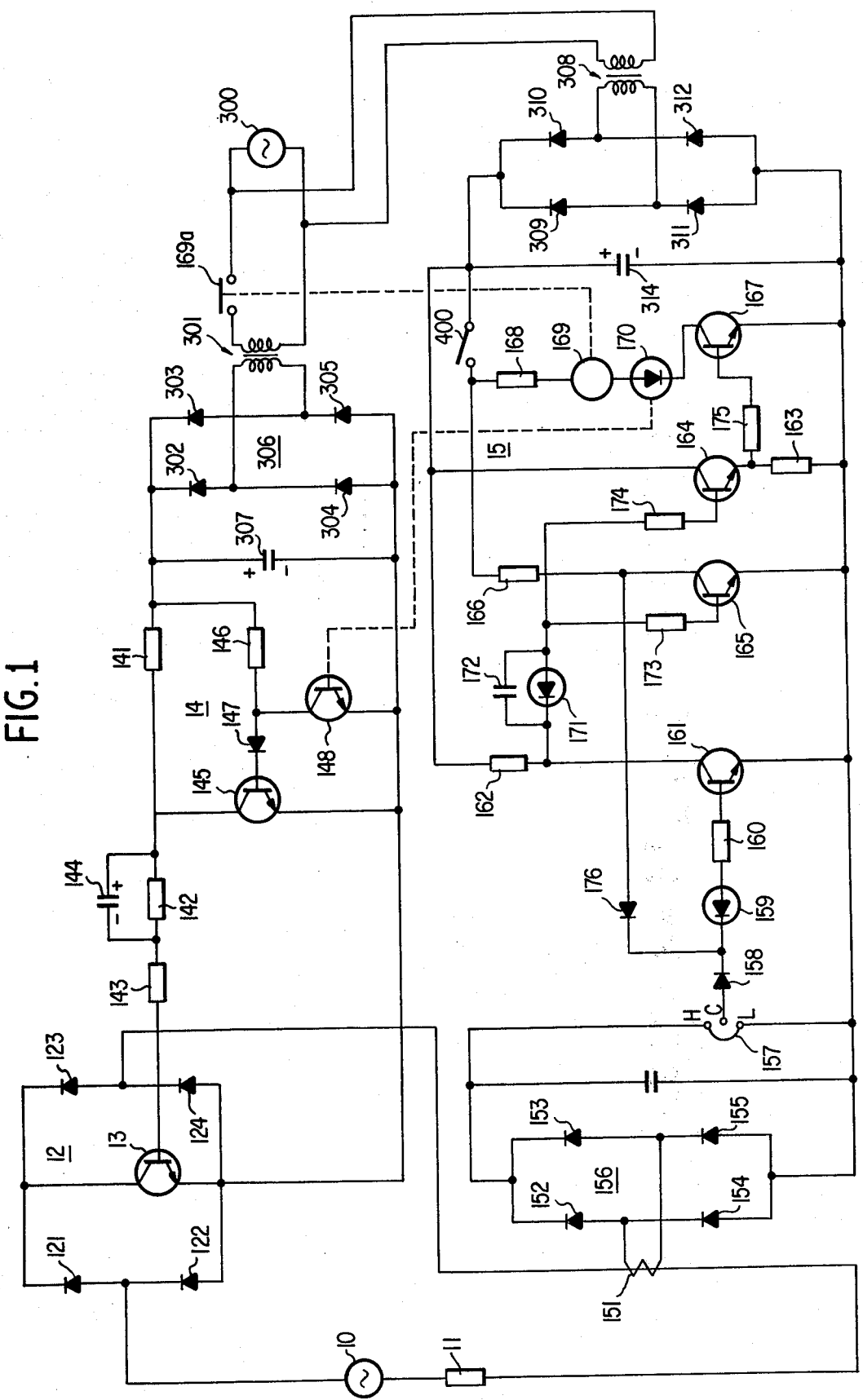
FIG. 1 is an electrical circuit diagram showing one embodiment of the static type circuit breaker according to this invention.

Referring now to the drawings, wherein like reference numerals designate identical or corresponding parts throughout, and more particularly to FIG. 1 thereof, 10 is an alternating current power source and 11 is a load connected to the power source 10 through the intermediary of a switch unit 12. The switch unit 12 is provided with a single phase bridge rectifier circuit consisting of four diodes 121, 122, 123, and 124 and with an NPN type transistor 13 connected to the direct current output terminals of this rectifier circuit. The case of an alternating current single phase circuit is shown in FIG. 1. 14 is the base circuit of the transistor 13. 15 is a detector circuit which detects a fault current flowing in the load circuit supplying electrical power to the load 11 from the aforesaid alternating current power source 10 through the transistor 13 and sends a circuit-breaking command signal to the base circuit 14 of the transistor 13. A part of this detector circuit 15 also has the function of a switching circuit of the transistor 13. 300 is a control power source giving a control voltage to the base circuit 14 of the transistor 13 and to the detector circuit 15.

The base circuit 14 of the transistor 13 is provided with resistances 141, 142, and 143 connected in series to the base terminal of the transistor 13; a condenser 144 is connected in parallel with the resistance 142. Between the terminal of the resistance 141 not connected with the resistance 142 and the emitter terminal of the transistor 13 a connection with the control power source 300 is made through a transformer 301 and a single phase bridge rectifier circuit 306 consisting of diodes 302, 303, 304 and 305. By this means the necessary forward voltage is applied between the base terminal and the emitter terminal of the transistor 13; this voltage is smoothed by a condenser 307 connected to the direct current output terminals of the rectifier circuit 306. A short circuit between the base terminal and the emitter terminal of the transistor 13 can be produced by means of another NPN transistor 145 connected between them through the resistances 142 and 143. Between the base terminal and the emitter terminal of the transistor 145 a connection to the direct current output terminals of the aforesaid rectifier circuit 306 is made through the intermediary of a resistance 146 and a diode 147, and the base current of the transistor 145 is supplied by means of the control power source 300. 148 is a phototransistor producing a short circuit between the base terminal and the emitter terminal of the transistor 145.

Now, the detector circuit 15 is provided with a current transformer 151 which detects the magnitude of a fault current flowing in the load circuit. The secondary output of the current transformer 151 is proportional to the magnitude of the fault current. This output is applied between terminals H and L of a variable resistor 157 for setting the detection level by way of a single phase bridge rectifier circuit 156 consisting of diodes 152, 153, 154 and 155. A terminal C of the variable resistor 157 is connected, through a diode 158, a first constant voltage diode or Zener diode 159 and a resistance 160, to the base terminal of a first NPN type transistor 161, and the terminal L is connected to the emitter terminal of the transistor 161. Between the emitter terminal and the collector terminal of the transistor 161, a connection to the aforesaid control power source 300 is made through a transformer 308, a single phase bridge rectifier circuit 313 consisting of diodes 309, 310, 311 and 312, and a resistance 162.

Also, an NPN transistor 164 is connected, through a resistance 163, between the direct current output terminals of the rectifier circuit 313. Moreover, by way of a switch 400, firstly a connection to the direct current output terminals of the rectifier circuit 313 is made, between the collector terminal and the emitter terminal of a second NPN type transistor 165, through a resistance 166. Also the collector terminal and the emitter terminal of an NPN type transistor 167 are connected to these terminals through a resistance 168, a relay coil 169 and a luminous diode 170 all in series. Accordingly, collector currents are supplied from the rectifier circuit 313 to the transistors 161 and 164 directly and to the transistors 165 and 167 by way of the switch 400. The aforesaid luminous diode 170 is photocoupled to the phototransistor 148 of the base circuit 14; when voltage is applied to the luminous diode 170 and light is emitted, the phototransistor 148 receives that light and thus conducts. 314 is a smoothing condenser. Also, a connection is made between the collector terminal of the transistor 161 and the base terminal of the transistor 165 by way of a parallel circuit consisting of a second constant voltage diode or Zener diode 171 in parallel with a condenser 172, and a resistance 173 in series with this circuit. Likewise a connection is made between the collector terminal of the transistor 161 and the base terminal of the transistor 164 by way of the parallel circuit consisting of the constant voltage diode 171 and the condenser 172, and a resistance 174 in series with this circuit. Furthermore, the emitter terminal of the transistor 164 and the base terminal of the transistor 167 are interconnected by way of a resistance 175. Moreover, the collector terminal of the transistor 165 and the connection point between the constant voltage diode 159 and the diode 158 are interconnected by way of a diode 176. 169a is an auxiliary contact of the relay coil 169 and is connected in series in the primary circuit of the transformer 301.

The following is a description of the switching operation and circuit breaking operation of the static type circuit breaker constructed as described above. First, by means of the control power source 300 the smoothing condenser 314 of the detector circuit 15 is charged, with the polarity shown in the drawing, and a stable control voltage is established. By means of this smoothed voltage, a voltage is applied between the base terminal and the emitter terminal of the transistor 164, by way of the resistance 162, the condenser 172, the constant voltage diode 171 and the resistance 174, and the transistor 164 conducts. By this means a voltage is applied between the base terminal and the emitter terminal of the transistor 167. In this state, when the switch 400 is closed the transistor 167 conducts and the relay coil 169 connected in series with this transistor is excited, the auxiliary contact 169a of the base circuit 14 is closed and the control voltage is applied to the base circuit 14. Moreover, voltage is applied to the luminous diode 170 also, whereby the phototransistor 148 of the base circuit 14 conducts and thus makes a short circuit between the base terminal and the emitter terminal of the transistor 145. This makes this transistor 145 non-conductive, and the smoothed voltage is applied, from the control power source 300, between the base terminal and the emitter terminal of the transistor 13, by way of the resistances 141, 142 and 143 and the condenser 144. This causes the transistor 13 to conduct. The conduction of the transistor 13 causes power from the power source 10 to be supplied to the load 11 by way of the switch unit 12 and the transistor 13.

To stop the supply of power to the load 11, the switch 400 is opened whereby the transistor 167 becomes non-conductive, voltage ceases to be applied to the luminous diode 170, and the phototransistor 148 is made nonconductive This causes the transistor 145 to conduct and make a short circuit between the base terminal and the emitter terminal of the transistor 13 and make this transistor 13 non-conductive, thus opening the load circuit. Now, the excitation of the relay coil 169 ceases and after a mechanical time lag the auxiliary contact 169a is opened so that the control voltage from the control power source 300, which had been applied to the base circuit 14, is completely cut off and the transistor 145 is made non-conductive. In this case, if the switch 400 is left open voltage is not applied to the luminous diode 170 and the phototransistor 148 of the base circuit 14 is non-conductive. Therefore even if the contact 169a is closed erroneously, the transistor 145 conducts and thus makes the transistor 13 non-conductive and erroneous supply of power to the load is prevented.

The following description concerns the circuit-breaking operation when a fault current has flowed in the load circuit. When the switch 400 has been closed so that electrical power is being supplied to the load 11 as described previously, if short circuit trouble occurs then the value of the current flowing in the load circuit will be equal to the base current of the transistor 13 multiplied by the current amplification factor (hfe). This fault current is detected by the current transformer 151. The secondary side output of the current transformer 151 is proportional to the magnitude of the fault current. This output is rectified by the rectifier 156 and the output of this is applied to the variable resistor 157 and thus converted to a voltage value.

The fault current detection level is determined by adjustment of the value of the resistance between the terminals C and L of the variable resistor 157. The voltage between the terminals C and L of the variable resistor 157 is applied to the constant voltage diode 159 through the diode 158, and when this becomes greater than the Zener voltage of the constant voltage diode 159, the constant voltage diode 159 conducts. Base current is supplied to the transistor 161 by way of the resistance 160 and the transistor 161 is made to conduct. This causes a short circuit between the base terminal and the emitter terminal of the transistor 165 to be produced by the transistor 161, and the transistor 165 becomes non-conductive. Also, the collector voltage of the transistor 165 goes from the "0" level to the "1" level. Base current is supplied to the transistor 161 from the control power source 300 through the diode 176, the constant voltage diode 159 and the resistance 160. Therefore, the transistor 161 maintains itself and thereafter continues to conduct. The self-maintaining time depends on the transistor, and therefore this can be carried out at a high speed of several dozen to several nanoseconds. On the other hand, when the transistor 161 conducts, the charge stored in the condenser 172 is applied as an inverse voltage between the emitter terminal and the base terminal of the transistor 165. Accordingly, an inverse current is supplied so that the transistor 165 is made non-conductive at high speed. The conduction by the transistor 161 causes all the transistors 165, 164 and 167 to become non-conductive and voltage ceases to be applied to the luminous diode 170. Therefore, the phototransistor 148 of the base circuit 14 becomes non-conductive. After this, as in the previously described switching operation, base current is supplied to the transistor 145 from the control power source 300 through the resistance 146 and the diode 147. The transistor 145 conducts, and the base circuit of the transistor 13 is short-circuited by the transistor 145, and the transistor 13 becomes non-conductive so that the fault current is cut off. In this circuit breaking operation the fault current is cut off by a transistor, and therefore no arc occurs at all. Arc extinguishing apparatus is not needed and noise also does not occur. Further, there are no mechanical movable parts and therefore the opening speed is faster than with the former mechanical circuit breakers, and circuit breaking is fully completed within 0.1 ms. Theoretically speaking, in the case of a transistor, the collector current that flows is not more than the base current multiplied by the current amplification factor, and therefore it is possible to cut off an infinitely large fault current. Also, if necessary, as in shutting off the transistor 13 if the charge stored in the condenser 144 is used to supply an inverse current between the emitter terminal and the base terminal of the transistor 13 through the transistor 145 and the resistance 143, the circuit breaking time is made shorter.

Also, simultaneously with the breaking of the circuit the excitation of the relay coil 169 ceases and therefore the auxiliary contact 169a opens and the voltage from the control power source 300 is shut off completely and wasteful power loss can be eliminated. Moreover, for making the transistor 13 non-conductive a commutation circuit is not needed; the fault current is cut off at high speed merely by cutting off the base current. Therefore repeated circuit breaking with high speed reclosing can be carried out, and the dimensions also can be reduced to about two thirds of those of the former apparatus in which thyristors were used.

When the fault has been remedied, to supply power to the load 11 the switch 400 is closed whereby the transistor 13 is made conductive by the operation described previously, so that power is supplied.

Figure 2:
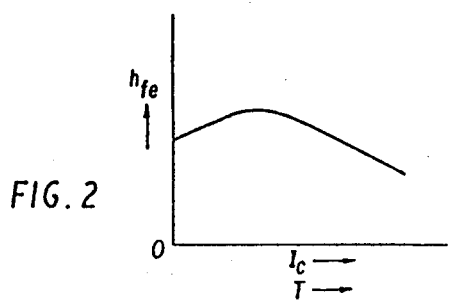
FIG. 2 is a characteristic diagram showing the relationship between the current amplification factor and the collector current and temperature of a transistor used in a static type circuit breaker according to this invention.

Generally, in the case of transistor elements, as shown by the characteristic diagram in FIG. 2, as factors such as the collector current or the temperature increase the current amplification factor varies so that at first it increases but after reaching a certain value it decreases. Thus, when a current corresponding to the rated current of the circuit is flowing, this is, in the range in which the current amplification factor is large, when a fault current flows, as time passes the current amplification factor also becomes smaller and the fault current rapidly becomes smaller. In the present invention, the arrangement is such that the fault current decreases and before it gets below the fault current level the fault current is detected and subsequently a detection signal is continously detected by a self-maintaining circuit, and therefore the fault current can be reliably detected although a transistor is used as the switching element.

Also, when the switch 400 is closed, in order to ensure that the self-maintaining operation of the transistor 161 will not function incorrectly, in the present invention the base current of the transistor 165 is already supplied by the charge stored in the condenser 314 before the switch 400 is closed. When the switch 400 is closed the transistor 165 at once conducts so that it is certain that a "1" level signal input will be produced at the collector terminal of the transistor 165, and therefore incorrect functioning during ordinary switching operation can be prevented.

In the foregoing embodiment a single phase alternating current circuit was taken as an example and described, but when the invention is applied to a polyphase alternating current circuit, this can be done by connecting a respective switch unit having a transistor to each phase load circuit.

Also, the present invention is not restricted to alternating current circuits but can be applied in direct current circuits also.

Figure 3:
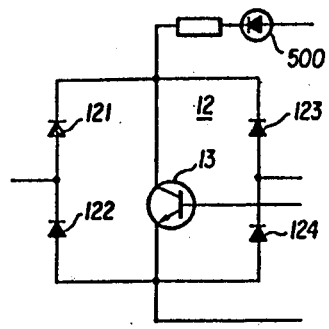
FIG. 3 is a circuit diagram showing a current detector circuit of a static type circuit breaker according to another embodiment of this invention.
Figure 4:
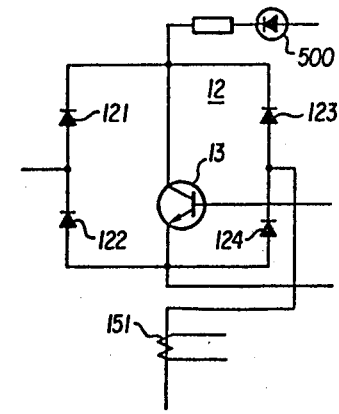
FIG. 4 is a circuit diagram showing another embodiment of a current detector circuit according to this invention.

FIG. 3 shows an arrangement in which in order to detect the fault current flowing in the load circuit the collector voltage of the transistor 13 is detected by a constant voltage diode 500 and used for the subsequent detection signal. When the fault current flows in the transistor 13, the transistor 13 abruptly goes into the active range and produces an impedance, and this causes a collector voltage to be generated. Accordingly, it is possible to detect the fault current by taking the magnitude of the collector voltage out through the constant voltage diode 500.

Also, the fault current detection methods shown in FIG. 1, and FIG. 3 may be used by itself, or they may be used in combination with one another. For example, it is possible, as shown in FIG. 5, to detect the fault current flowing in the load circuit by the magnitude of the voltage, by means of the constant voltage diode 500, and also to detect it by the magnitude of the current, by means of the current transformer 151, and thus to control the circuit-breaking operation of the transistor 13 and effect power control in both ways, by current and by voltage.

Figure 5:
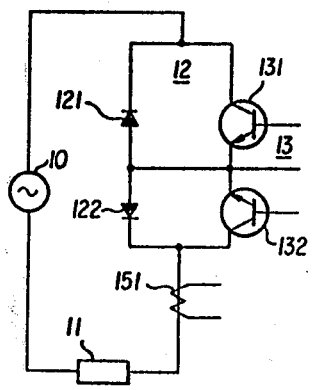
FIG. 5 is a circuit diagram showing another embodiment of a switch unit in this invention.

FIG. 5 shows a modification of the switch unit 12. A switch unit 12 in which the transistor 131 and a diode 121, the transistor 132 and a diode 122 respectively connected in antiparallel are in antisymmetrical series connection, is connected between the power source 10 and the load 11. A fault current can be cut off at high speed merely by cutting the base current.

Figure 6:
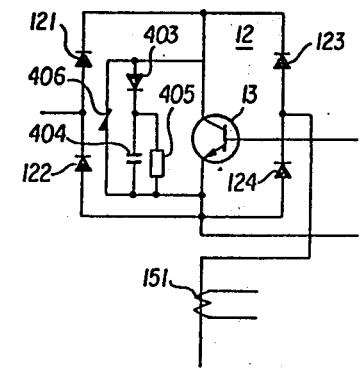
FIG. 6 is a circuit diagram in which a surge absorption circuit and a surge absorption element are connected to a switch unit in this invention.

In the switch unit 12 shown in FIG. 6, a surge absorbing circuit consisting of a diode 403, a condenser 404 and a resistance 405, and a nonlinear resistor or other surge absorbing element 406, are connected. When the transistor 13 cuts off a fault current, a surge occurs. The surge energy charges the condenser 404 through the diode 403. When this is charged above a certain value, energy is absorbed in the surge absorption element 406, and the surge energy that had been stored in the condenser 404 is consumed in the resistance 405.

Figure 7:
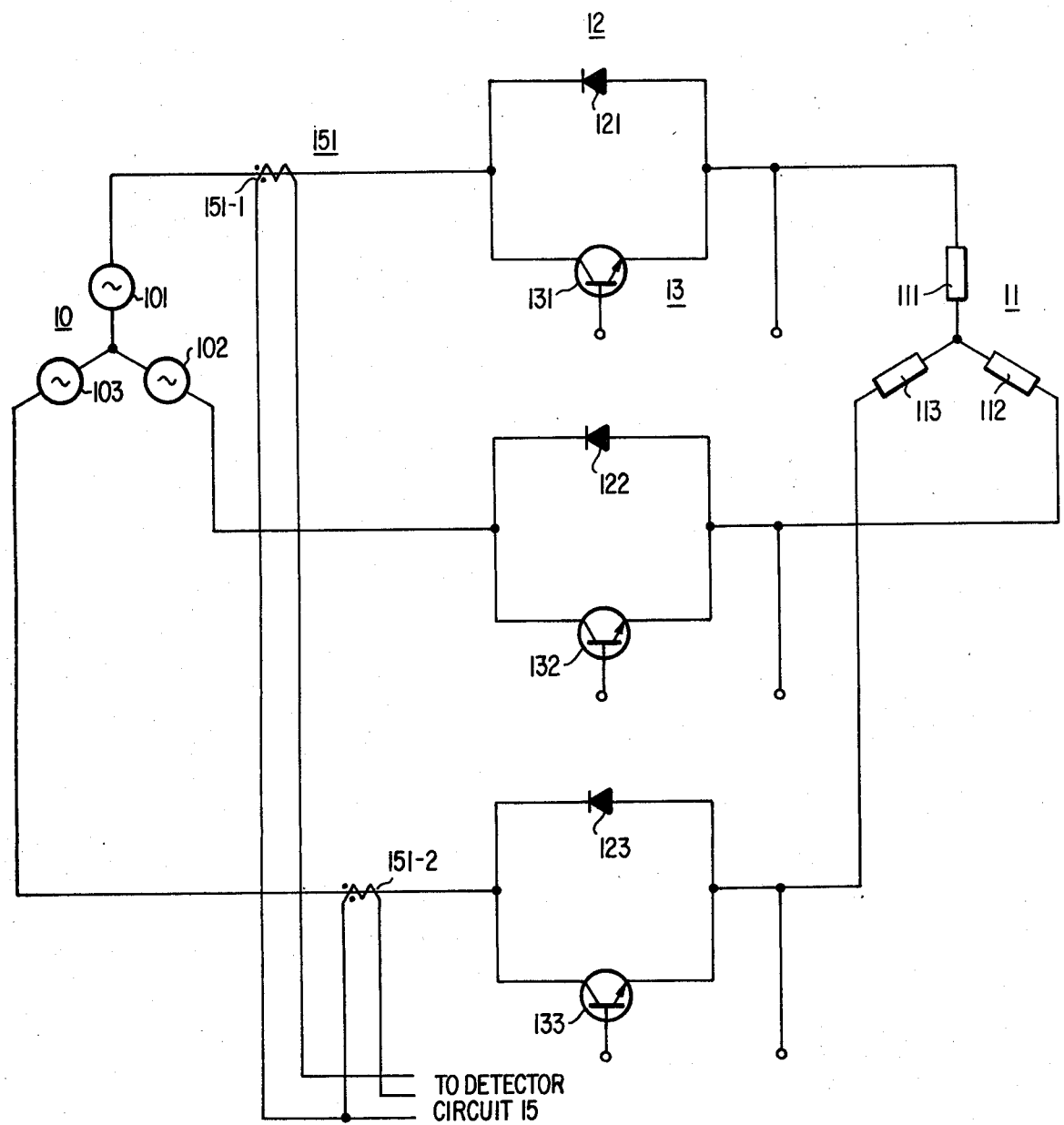
FIG. 7 is a circuit diagram showing another embodiment of a switch unit in this invention applied to the three phase circuit.

FIG. 7 shows a modification in the switch unit 12 applied to the three phase circuit. The switch unit in which a transistor 131 and a diode 121, a transistor 132 and a diode 122, and a transistor 133 and a diode 123 are in antiparallel connection respectively, is connected between the three phase power source 10 and the three phase load 11. A fault current can be cut off at high speed merely by cutting the base current of the transistor switch.

When this invention is used, a transistor is employed as the switch element, and by detection of a fault current the base circuit of the transistor is controlled so that the transistor is made non-conductive and the fault current is thus cut off. Therefore the apparatus gives little trouble. Its life is long. No arc occurs at all and therefore arc extinguishing apparatus is not needed. Further, the circuit breaking capacity is improved. No noise occurs. Also, a commutation circuit is not needed. Therefore, it is possible to provide a compact and inexpensive static type circuit breaker which permits high speed repeated closure.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. In a load circuit containing a power source and a load, a static type circuit breaker comprising:
   a first transistor adapted to be connected in series in the load circuit with the power source and the load;
   a detector adapted to be connected to the load circuit for detecting a fault current flowing in the load circuit, the detector including
   a second transistor;
   a third transistor;
   a first constant voltage diode connected to the base of the second transistor and conductive when a fault current flows through the load;
   a parallel circuit, consisting of a second constant voltage diode in parallel with a condenser, connected to the collector of the second transistor and to the base of the third transistor;
   a diode having its cathode connected to the base of the second transistor and its anode connected to the collector of the third transistor to form a self-maintaining circuit for the second transistor;
   means for connecting the collector of the second transistor to a control power source;
   means for connecting the collector of the third transistor to the control power source;
   whereby when a fault current has flowed, the second transistor is made conductive and is made self-maintaining and the third transistor is made non-conductive to produce a fault voltage detection signal; and
   means responsive to the producing of the detection signal for cutting off the base current of the first transistor to render the first transistor non-conductive.

2. A static type circuit breaker as claimed in claim 1, wherein the detector includes a current transformer adapted to be connected between the first constant voltage diode and the load circuit.

3. A static type circuit breaker as claimed in claim 1, wherein the detector includes an impedance element adapted to be connected between the first constant voltage diode and the load circuit.

4. A static type circuit breaker as claimed in claim 1, including a surge absorbing circuit connected in parallel between the collector and the emitter of the first transistor.

5. A static type circuit breaker as claimed in claim 1, including a condenser connected between the base and the emitter of the first transistor, and wherein a charge stored in the condenser is supplied as an inverse current between the base and the emitter of the transistor when the fault current is being cut off by means of the transistor.

6. A static type circuit breaker as claimed in claim 1, including a bridge rectifier circuit adapted to be connected in series in the load circuit with the power source and the load, the first transistor being connected to the direct current output terminals of the bridge rectifier circuit.

7. A static type circuit breaker as claimed in claim 1, including a diode in antiparallel connection with the first transistor.

8. A static type circuit breaker as claimed in claim 1, including a light transmission device between the base current cutting off means and the detector.

9. A static type circuit breaker as claimed in claim 1, wherein the light transmission device includes a luminous diode provided in the detector, a photo transistor provided in the base current cutting off means, and a light guide coupling the luminous diode and the photo transistor.

10. In a load circuit containing a power source and a load, a static type circuit breaker comprising:
   a transistor adapted to be connected in series in the load circuit with the power source and the load;
   a fault detecting device comprising a current transformer connected to the load circuit for detecting a fault current flowing in the load circuit to produce a fault detection signal, a self-maintaining circuit connected to the current transformer for self maintaining the detection signal when a fault occurs and an insulating transformer for insulating the fault detecting device from a control power source;
   a base current cutting off circuit having a capacitor for cutting off the base current of the transistor when a fault occurs and at the same time for supplying an inverse voltage charged in the capacitor to the base-emitter terminal of the transistor; and
   a light transmission device provided between the fault detecting device and the base current cutting off circuit.

* * * * *